Dec. 19, 1939.   S. M. PARKER   2,184,057
FLUID PRESSURE CONTROL SYSTEM
Filed Nov. 16, 1937   3 Sheets-Sheet 1

Inventor
Sydney M. Parker
By
Martin J. Finnegan
Attorney

Dec. 19, 1939.    S. M. PARKER    2,184,057
FLUID PRESSURE CONTROL SYSTEM
Filed Nov. 16, 1937    3 Sheets-Sheet 2

Inventor
Sydney M. Parker
By
Martin J. Finnegan, Attorney

Inventor
Sydney M. Parker
By
Martin J. Finnegan
Attorney

Patented Dec. 19, 1939

2,184,057

UNITED STATES PATENT OFFICE 2,184,057

FLUID PRESSURE CONTROL SYSTEM

Sydney Macdonald Parker, Myton, England, assignor to Automotive Products Company Limited, London, England Application November 16, 1937, Serial No. 174,880
In Great Britain November 17, 1936

9 Claims. (Cl. 244—102)

This invention relates to fluid pressure remote control systems in which a common master cylinder unit or other source of fluid pressure is used for actuating a plurality of slave units in a predetermined sequence.

One object of the invention is to provide a fluid pressure remote control system including slave units adapted to operate in a predetermined sequence.

Another object of the invention is to provide a fluid pressure remote control system having a plurality of slave units adapted to be actuated in a predetermined sequence during operation in one direction and in a reverse sequence during operation in the other direction, and including a valve, the setting of which is automatically changed at the completion of a movement by one of the slave units so as to initiate the next succeeding stage in the operation. Thus, the remote control system may comprise a source of fluid pressure, a plurality of slave units to be actuated therefrom in a predetermined sequence and a valve associated with each of said slave units, the arrangement being such that at the termination of the operating movement of one of the slave units, said slave unit actuates the corresponding valve and this places the next slave unit in the sequence into connection with the source of fluid pressure.

Another object of the invention is to provide a fluid pressure remote control system for aircraft for the purpose of operating automatically the retractable undercarriages and the fairing doors or equivalent closure members of the compartments within which the wheels are stowed when the undercarriage is retracted.

Yet another object of the invention is to provide a fluid pressure remote control system adapted to actuate a retractable undercarriage of an aircraft, the wheels of which are adapted to fold into a compartment having a door, one slave unit of the system serving to open and close said door and the other slave unit to raise and lower the undercarriage, whereby a valve connected in the fluid supply conduit to the undercarriage slave unit is opened by the door in assuming its fully opened position, while a valve connected in the feed to the slave unit operating the door is similarly opened by the undercarriage as the latter reaches its fully retracted position.

Another object of the invention is to provide a fluid pressure control system for aircraft in which the compartment housing the undercarriage or one side thereof is provided with a plurality of doors, each of which actuates a separate valve, said valves being connected in series with the fluid feed to the undercarriage slave unit so that the latter cannot operate to lower the undercarriage until all of said doors are fully opened. It is common to provide the undercarriage with a latch device which is released by fluid pressure, and this device may be arranged so that as it comes into its holding position it actuates the valve which diverts the supply of pressure fluid to the slave unit or units serving to close the door or doors.

Other objects and features of the invention and other novel combinations of parts and desirable particular constructions will be apparent from the following description and from the accompanying drawings in which Figure 1 is a diagram showing a very simple system in order to make the principle of the invention clear;

Figure 1:
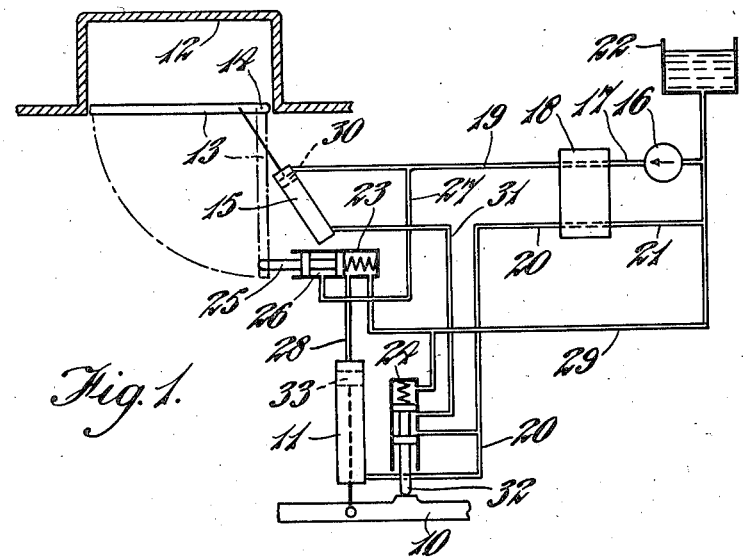
Figure 2:
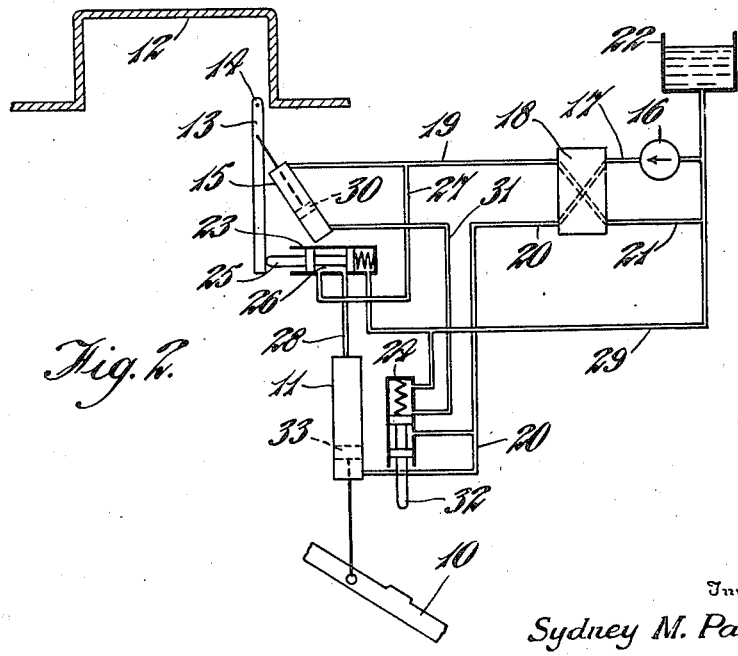
Figure 2 is a diagram similar to Figure 1 but with the parts in different positions.

In the system shown in Figures 1 and 2 an undercarriage, one member of which is indicated at 10, is arranged to be retracted and extended by means of a double-acting slave cylinder unit or jack 11, and during the retracting operation the undercarriage is drawn up into a compartment 12 conveniently formed in the wing, fuselage or any other convenient part of the aircraft, said compartment in the example shown in Figures 1 and 2 being fitted with a single door 13 pivotally mounted at 14. The door 13 is opened and closed by a double-acting slave cylinder indicated at 15.

Fluid pressure is utilised for actuating the slave cylinder units 11 and 15, and is derived from a pump 16 which discharges through a conduit 17 into a control valve 18 adapted to connect the conduit 17 with either one of two conduits shown at 19 and 20, the other of said conduits being simultaneously connected with a return conduit 21 leading to the inlet passage of the pump 16 and also to a reservoir 22. The valve 18 thus has for a function to determine in which direction the undercarriage gear is to be actuated.

The operation of the slave cylinder units 11 and 15 in their proper sequence is ensured by interlocking valves 23 and 24. The former is provided with a plunger 25 which is spring-influenced towards the left but is shifted in the opposite direction as the door 13 reaches its fully open position indicated by the broken lines in Figure 1. The plunger 25 is formed with an annular groove 26 which when the valve is moved to its "on" position as shown in Figure 2 connects a branch conduit 27 from the conduit 19 with a conduit 28 leading to the upper compartment of the slave cylinder unit 11. On the other hand when the valve is in its "off" position as shown in Figure 1, the conduit 28 is automatically connected with the reservoir 22 by means of a conduit 29 leading into the end part of the body of the valve 23.

In the position of the parts shown in Figure 1 the undercarriage is retracted as represented by the raised position of the member 10 when the fairing door 13 is closed. When it is desired to lower the undercarriage the valve 18 is arranged, as shown in Figure 1, so that the output from the pump 16 passes into the conduit 19 while the conduit 20 is placed in direct communication with the reservoir 22 and the suction side of the pump 16. The pressure fluid cannot pass through the conduit connection as the valve 23 is in its "off" position, so that its only path is into the upper compartment of the slave cylinder unit 15, the piston 30 of which is thus moved so that the door 13 is opened. At the end of the opening movement the door 13 takes up the position shown in Figure 2 and automatically moves the valve plunger 25 to its "on" position. During this actuation of the slave cylinder unit 15 the fluid disposed below the piston 30 was, of course, expelled through a conduit 31 leading to the interlock valve 24 and thence through the conduit 20 back to the pump 16. The opening of the valve 23 enables the pressure fluid to pass through the conduit 27 into the conduit 28, and the upper part of the slave cylinder unit 11 thereby lowering the undercarriage 10. It will be seen that the first part of this movement releases the plunger 32 of the valve 24 which is thus set in a position in which it is ready to operate the next time the undercarriage is to be retracted.

During the retraction of the undercarriage the slave cylinder units 11 and 15 work in the reverse sequence and for bringing about this retraction the valve 18 is set so that the pressure fluid from the pump 16 is passed into the conduit 20 as shown in Figure 2. The valve 24 being in its "off" position the fluid cannot enter the conduit 31 and so it is obliged to pass into the slave cylinder unit 11 below the piston 33 thereof, thus bringing about the raising or retraction of the undercarriage 10. During this stage the fluid expelled from the slave cylinder unit 11 passes from the conduit 28 across the groove 26 in the plunger 25 and thence back to the reservoir through the conduit 19. This movement continues until the undercarriage has been fully retracted, at which point the valve plunger 32 is moved to its "on" position as seen in Figure 1 where it allows the pressure fluid from the conduit 20 to enter the conduit 31 and thus force the piston 30 of the slave cylinder unit 15 in the direction required to close the door 13.

It will thus be seen that during the lowering of the undercarriage the slave cylinder unit 15 is caused to finish its operation before the slave cylinder 11 begins to act, thus ensuring that the door 13 is completely open before the undercarriage itself begins to move. During the raising operation, however, it is the slave cylinder unit 11 which moves first, and it is not until the undercarriage has been completely retracted that the pressure fluid is allowed to act within the slave cylinder 15 for closing the door 13.

Figure 3:
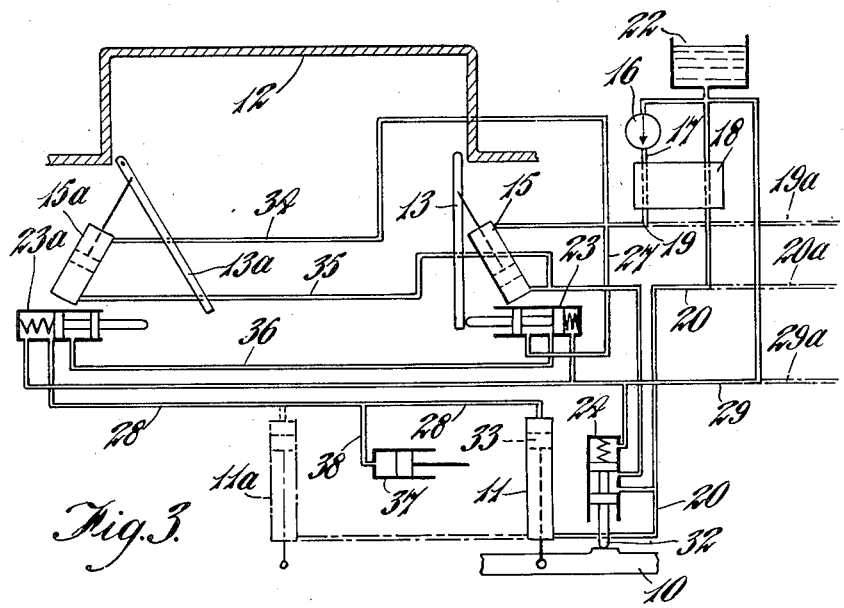
Figure 3 is a diagram showing the installation for an undercarriage having two fairing doors.

This principle of operation is carried further in the example shown in Figure 3, where the compartment 12 for the housing of the undercarriage 10 when folded is fitted with a pair of doors 13 and 13a. The second door 13a is opened and closed by means of a slave cylinder unit 15a connected by conduits 34 and 35 in parallel with the slave cylinder unit 15, while said door 13a on reaching its fully open position actuates a valve 23a. This is similar to the valve 23, but it will be noticed that the conduit 28 from the upper end of the slave cylinder unit 11 now passes to the valve 23a and a conduit 36 from the latter connects with the valve 23. Thus, the passage of fluid from the conduit 19 through the connection 27 and thence to the slave cylinder unit 11 is controlled by both the valves 23 and 23a, since these are connected in series. This ensures that during the lowering of the undercarriage both of the doors 13, 13a must be completely open before the slave cylinder unit 11 is fed with pressure fluid. The system shown in Figure 3 is primarily intended for large aircraft having two separate undercarriages one on each side. The components shown, with the exception of the reservoir 22, pump 16 and valve 18 all relate to one side of the aircraft only, and the installation would, of course, be repeated on the other side and be connected to conduits indicated in broken lines at 19a, 20a and 29a so that both undercarriages work in unison from a single control valve 18. Undercarriages are, of course, frequently actuated by two or more slave cylinder units working in parallel, and one such unit is indicated at 11a in Figure 3. Moreover, where the undercarriage is retained in its raised position by a hydraulically releasable latch device this may be connected with the conduit 28 so as to be fed in common with the slave cylinder units 11, 11a during the lowering of the undercarriage. Such a latch device is indicated at 37 and is connected to the conduit 28 by a conduit 38.

Figure 4:
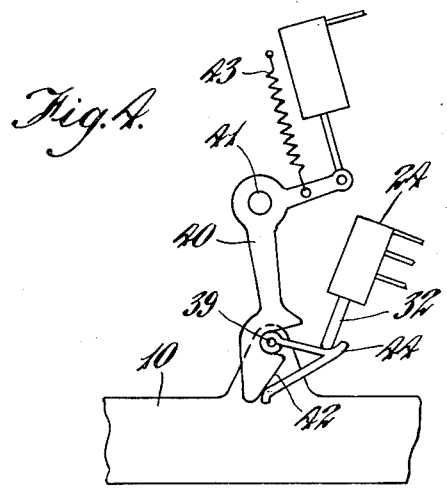
Figure 4 shows diagrammatically in side elevation a form of undercarriage latch for use in conjunction with the invention.

If desired, the latch member 37 for the undercarriage can be arranged so as to actuate the valve 24 as this ensures that the undercarriage is definitely locked before the doors 13, 13a are allowed to close. One such arrangement is shown in Figure 4 where the member 10 of the undercarriage is fitted with a pin 39 adapted to engage as shown with a notch formed in the lower part of a lever 40 pivoted at 41 to a fixed part of the aircraft. A sloping surface 42 also upon the lower end of the lever 40 causes the lever 40 to move sideways as the undercarriage 10 is raised and to snap into its locked position under the action of a spring 43. With a view to ensuring that the valve 24 shall not be moved to its "on" position until this takes place a V-shaped member 44 is freely pivoted at the extremity of one of its limbs upon the pin 39, and is so shaped that the extremity of its other limb is pushed forward by the lever 40 as the latter assumes its locked position. This advancing movement raises the centre part of the member 44, thus bringing it into contact with the plunger 32 of the valve 24 and moving the latter to its "on" position for closing the doors 13, 13a.

Figure 5:
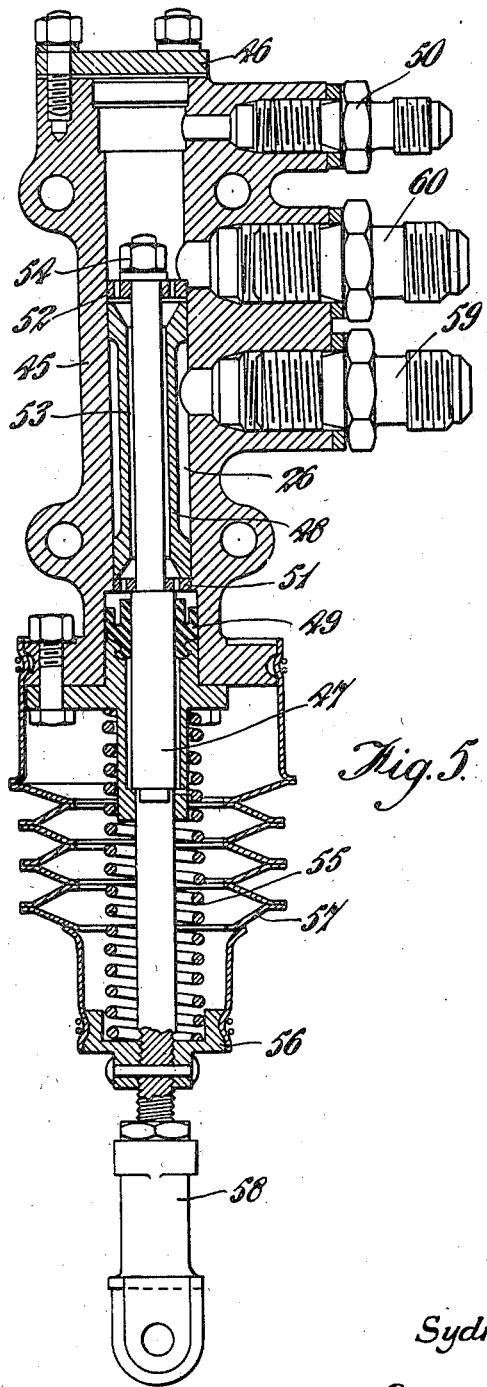
Figure 5 is a sectional elevation of one form of plunger valve.

A convenient construction of interlocking valve for use with the improved system is shown in Figure 5, and comprises a cylindrically bored casing 45 which is closed at its end by a cap 46 and contains a plunger comprising a rod 47 loosely fitted with an elongated piston head 48 formed with the annular groove 26. A fluid tight fit around the rod 47 is obtained by the use of a U-shaped rubber packing washer 49, and in order that the space between this and the piston head 48 may be in permanent communication with a connection 50 leading to the conduit 29 and reservoir 22 of the system the plunger head 48 is held in position by perforated washers 51 and 52, and a clearance space 53 is maintained between the interior surface of the piston head 48 and the rod 47 upon which it is held by means of a nut 54. The piston head 48 is urged towards its "off" position as shown in Figure 5 by means of a coiled compression spring 55 surrounding the outer end of the rod 47 and abutting against a collar 56 secured thereto. The relatively slidable parts of the valve are protected against the ingress of dirt by a flexible bellows 57, while the outer end of the rod 47 is provided with a fitting 58 through the medium of which the valve is moved to its "on" position. The body 45 in addition to having the connection 50 is provided with main connections 59 and 60 to be joined for example to the conduits 27 and 28 respectively in the case of the valve 23 shown in Figure 1 and the conduits 20 and 31 respectively in the case of the valve 24. Where an electrical or other indicating device is used to advise the pilot when the undercarriage is retracted, the switch or equivalent by which the indicating system is worked may conveniently be actuated by the rod 47 of the appropriate interlocking valve, said switch or equivalent (not shown) being conveniently secured to the cover 46 and being operated by an extension of the rod 47 passing therethrough.

The term "fluid" as used herein includes liquid and gaseous media, but in the examples described, liquid, such as oil, is preferably employed. It will be understood that the fluid pressure remote control system according to the invention may be applied to other purposes than the operation of aircraft undercarriages, suitable modifications being made in the system to adapt it to such other purposes.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is—

1. In an undercarriage fluid pressure control system the combination of a compartment adapted to house the undercarriage, a door for closing said compartment, a slave unit for operating the door, a slave unit for operating the undercarriage, means including a part engageable by the compartment door itself for insuring operation of said slave units in one sequence in one direction and means including a part operated by the undercarriage for insuring operation of said slave units in a reverse sequence in the other direction.

2. In an undercarriage fluid pressure control system the combination of a compartment adapted to house the undercarriage, a door for closing said compartment, a slave unit for operating the door, a slave unit for operating the undercarriage, a valve controlling the supply of pressure fluid to the undercarriage slave unit and adapted to be operated by the door in assuming its opened position and a valve controlling the supply of pressure fluid to the door slave unit and adapted to be operated by the undercarriage in assuming its retracted position.

3. In an undercarriage fluid pressure control system the combination of a source of pressure fluid, a compartment adapted to house the undercarriage, a plurality of doors for said compartment, a valve associated with each door and adapted to be operated by the latter in assuming its opened position, means connecting the source of pressure fluid in series with the valves, means for operating the undercarriage, and means connecting one of said valves to the undercarriage operating means.

4. In an undercarriage fluid pressure control system the combination of a source of pressure fluid, a reservoir, a compartment for housing the undercarriage, a door for said compartment, a slave unit for folding and lowering the undercarriage, a slave unit for opening and closing the door, a valve operated by the door and adapted to control flow through the connections of the undercarriage operating slave unit, and a valve operated by the undercarriage and adapted to control flow through the connections of the door operating slave unit.

5. In a fluid pressure control system the combination of a source of pressure fluid, an operated element, a latch device for locking said operated element, a slave unit operating another element, and means adapted to connect automatically the source of fluid pressure to said slave unit upon locking of the first element by the said latch, said means comprising a valve disposed in the path of movement of, and therefore shiftable by said latch device.

6. In an undercarriage fluid pressure control system the combination of an undercarriage, a compartment for housing the undercarriage, a source of fluid pressure, a door for said compartment, a latch device adapted to lock the undercarriage in retracted position, a fluid pressure operated slave unit operating the door, and means adapted to connect automatically the source of pressure fluid to said slave unit upon retracting movement of the undercarriage, said means comprising a valve disposed in the path of movement of, and therefore shiftable by said latch device.

7. In a fluid pressure remote control system the combination of a source of pressure fluid, a reservoir, a plurality of slave units, a connection between one slave unit and the reservoir, a connection between said slave unit and the source of fluid pressure for operating said slave unit in one direction, a valve having a valve member and which in one position has a connection with the source of pressure fluid which is shut off by said valve member and a connection with another slave unit, which connection communicates with the reservoir, said valve being automatically brought upon operation of the first slave unit in a position in which the valve member connects the second slave unit with the source of pressure fluid by a path which is exclusive of the first slave unit and shuts off the said communication with the reservoir, and a valve actuated upon operation of the second slave unit and adapted to control flow through the connections of the first slave unit to operate it in the opposite direction.

8. In an undercarriage fluid pressure remote control system the combination of a source of pressure fluid, a reservoir, a compartment for housing the undercarriage, a door for closing the compartment, a slave unit for operating the undercarriage, a slave unit for operating the door, a connection between the door operating unit and the source of pressure fluid, a connection between the door operating unit and the reservoir, a valve having a valve member and which in one position has a connection with the source of pressure fluid which when the door is closed is shut off by the valve member and a connection with the undercarriage operating unit which connection communicates with the reservoir, said valve being automatically brought upon opening of the door in a position in which the valve member connects the undercarriage operating unit with the source of pressure fluid and shuts off the said communication with the reservoir, and a valve disposed in the path of movement of, and therefore actuated by the undercarriage and adapted to control flow through the connections of the door operating unit.

9. In a fluid pressure control system the combination of a source of pressure fluid, a plurality of fluid pressure responsive slave units, a valve connected to the source of pressure fluid by a connection which is shut off in one position of the valve, the latter being adapted upon operation of one slave unit to be automatically set into another position in which the source of pressure fluid is connected to another slave unit by a path which is exclusive of the first slave unit, whereby said two slave units are actuated in a predetermined sequence in one direction, and means additional to said valve to require actuation of the said two slave units to take place in the reverse sequence in the opposite direction.

SYDNEY MACDONALD PARKER.